United States Patent [19]

Iijima

[11] Patent Number: 5,196,042
[45] Date of Patent: Mar. 23, 1993

[54] MYCELIAL FERTILIZER

[76] Inventor: Ryusuke Iijima, 8-14, Minamisenzoku 1-chome, Ota-ku, Tokyo, Japan

[21] Appl. No.: 759,973

[22] Filed: Sep. 17, 1991

Related U.S. Application Data

[63] Continuation of Ser. No. 338,912, Apr. 14, 1989, abandoned.

[30] Foreign Application Priority Data

Apr. 15, 1988 [JP] Japan .................................. 63-93996

[51] Int. Cl.$^5$ ............................................. C05F 11/08
[52] U.S. Cl. ................................. 71/8; 71/5; 71/6; 71/9; 71/21; 71/23
[58] Field of Search .................................. 71/8, 23, 24

[56] References Cited

U.S. PATENT DOCUMENTS

| | | | |
|---|---|---|---|
| 3,838,198 | 9/1974 | Bellamy et al. ................. | 210/606 X |
| 4,077,793 | 3/1978 | Krupicka ................................. | 71/7 |
| 4,311,510 | 1/1982 | Graefe ..................................... | 71/9 |
| 4,311,511 | 1/1982 | Graefe ..................................... | 71/9 |

FOREIGN PATENT DOCUMENTS

| | | | |
|---|---|---|---|
| 0208191 | 12/1983 | Japan .................................... | 71/23 |
| 1054339 | 11/1983 | U.S.S.R. ................................ | 71/24 |

*Primary Examiner*—Ferris Lander
*Attorney, Agent, or Firm*—Armstrong, Westerman, Hattori, McLeland & Naughton

[57] ABSTRACT

The present invention relates to a mycelial fertilizer that is characterized in method, and the objects thereof are to provide a mycelial fertilizer wherein the mycelial fertilizer containing mainly thermactinomyces is carried on a specified carrier to contribute the metabolites of the thermoactinomyces and the decomposition products of the thermoactinomyces to the growth of plants as effective fertilizers in soil, and to provide a method of producing the mycelial fertilizer.

4 Claims, No Drawings

1

MYCELIAL FERTILIZER

This application is a continuation of application Ser. No. 338,912 filed Apr. 14, 1989, and now abandoned.

APPLICATION FIELDS IN INDUSTRIES

The present invention relates to a mycelial fertilizer that is characterized in method, and the objects thereof are to provide a mycelial fertilizer wherein the mycelial fertilizer containing mainly thermoactinomyces is carried on a specified carrier to contribute the metabolites of the thermoactinomyces and the decomposition products of the thermoactinomyces to the growth of plants as effective fertilizers in soil, and to provide a method of producing the mycelial fertilizer.

PRIOR ARTS AND THE PROBLEMS THEREOF

Hitherto, technologies wherein organic substances are fermented to use as fertilizers have been well known. For example, there have been known "A method of producing soil improving agents" disclosed in Japanese patent publication No. 45-11535, "A method of treating fowl droppings by fermentation" disclosed in Tokkai No. 48-26552, and "A method of producing soil improving agents with fertilizing effects" disclosed in Tokkai No. 52-50874.

These are all technologies which intend to use a mixture of a partly undecomposed organic substance, decomposed organic substance and mycelium generated by fermentation of organic substance as a fertilizer. However, in these technologies the effective mycelium or the fermentation conditions are not specified, and technologies similer to compost inherited from old times are only application empirically.

Therefore, fermented fertilizers previously disclosed do not display sufficient fertilizing effects and effct worse influences on plants inversely, as the case may be, in such a case, hitherto the analysis of the causes, that is, for example, the fermentation conditions and sorts of mycelium, and the elucidation of the causes have been not performed, the causes being judged as a low degree of fermentation from an empirical reason.

PROBLEMS TO BE SOLVED BY THE INVENTION

In view of the existing state of things mentioned above, the objects of the invention are to display a sure fertilizing effect by carrying a mycelial fertilizer containing selectively a specified mycelium having a sure fertilizing effect on a specified carrier and to produce surely the mycelial fertilizer under a specified fermentation conditions.

DETAILED DESCRIPTION OF THE INVENTION

The embodiments of the invention are described in detail in the following.

The thermoactinomyces usable favorably in the invention are helical germs in thermoactinomyces particularly growable at an elevated temperature of 55°–80° C. such as, for example, Thermoactinomyces vulgeris, Thermoactinomyces spora actinobifida(white) and the like.

The thermoactinomyces are selected as the main component of the mycelial fertilizer in the invention because harmful germs which give a harmful action on plants are very few in the thermoactinomyces.

Further, there are foodstuff growth hormones and various vitamins in the metabolites of the thermoactinomyces, and the thermoactinomyces are decomposed to give nitrogen supplying sources.

In the self-decomposition of thermoactinomyces, some of them may be decomposed into a gaseous state, resulting in few excessive supply of nitrogen into soil.

In the invention, the mycelial fertilizer is carried on a porous carrier of pH 5–9.5, preferably pH 8–9, because the pH range appropriate for the growth of thermoactinomyces is 7.5–9.5, preferably 8–9, and the growth of germs such as filamentous fungi and bacteria can be prevented in pH 5–9.5 to maintain the constant amount of thermoactinomyces in the mycelial fertilizer.

In the invention, the carrier is limitid to a porous carrier because water and air, the essential components for the growth of thermoactinomyces, are retained in the carrier during the storage of mycelial fertilizer or in using soil. As concrete examples of such porous carriers, any of organic or inorganic porous carrier maybe usable if the pH can be maintained to 7.5–9.5.

As the examples of porous carriers usable in the invention, there may be mentioned charcoal, active carbon, coal, coke and active coke.

In the invention, the mycelium comprising thermoactinomyces wherein the thermoactinomyces occupy 100% of the microorganism colony in the mycelium is most preferable, and the mycelium comprising thermoactinomyces of at least more than 50% of the microorganism colony is perferable.

Because, in case the thermoactinomyces is under 50%, the propagation of harmful germs, bacteria or filamentous fungi, may occur after using soil, effecting worse influences, and in case the thermoactinomyces is at least more than 50% in the microorganism colony in the mycelium, the dominant propagation of thermoactinomyces can be secured, the original object of the invention being attained.

The appropriate method of producing the mycelial fertilizer according to the invention is described in the following.

In the invention, the user of a porous of pH 7.5–9.5 and 6–30 mesh in particle size is preferable. The pH range of the porous carrier is limited to 7.5–9.5, because the pH range appropriate for the growth of thermoactinomyces is secured during the producing or keeping time of mycelial fertilizer as mentioned above and filamentous fungi including many harmful germs are difficult to grow in pH 7.5–9.5, preferably 8–9, of alkaline conditions.

In the invention, the particular size of porous carrier is limited to 6–30 mesh, because, in fermentation mentioned below, in case of a fine porous carrier over 30 mesh, the fermentation temperature is difficult to be maintained at more than 40° C., resulting in insufficient growth of thermoactinomyces, and in case of the larger particle size of porous carrier below 6 mesh, there is unfavorable complexity in handling when producing the fertilizer.

Such a porous carrier is used by 70–80 parts by weight, because, in case of under 70 parts by weight in the amount of porous carrier, the undecomposed organic substance rate increases in quantity unfavorably in the fermentation conditions mentioned below, and in case of the use exceeding 80 parts by weight, the water supplied from organic substances decreases in quantity as the water content in whole fermentation system, resulting in the unfavorable fermentation temperature.

In the invention, the porous carrier is kneaded with 20-30 parts by weight of an organic substance below 15% in the carbon rate and of 25-30% in the water content. In the invention, the organic substance is limited to the carbon rate below 15%, because, in case of the organic substance over 15% in the carbon rate, fibrous cellulose content increases, resulting in the increase in the demend of cellulase, and the growth of cellulase in actinomyces is dominant, the original object of the invention being unattainable, that is the inventors' experimental knowledge. In the invention, the water content of organic substance is limited to 25-60%, because, if the water of fermentation system kneaded is supplied only from the organic substance and it is less than 30-40%, the sufficient temperature for the fermentation of thermoactinomyces is unobtainable, and in case of the water content of fermentation system exceeding 40% or under 30%, the fermentation condition enough to ferment thermoactinomyces is unobtainable unfavorably in either case.

In the invention, the organic substance is used by 20-30 parts by weight, because, in case of less than 20 parts by weight, the growth of mycelium in each carrier is small due to the too small amount of the organic substance and the mycelium is not attached to each carrier in uniform dispersion, and in case more than 30 parts by weight of organic substance are mixed, the mixing balance of mycelium and porous carrier is lost, resulting in the excessive mycelium or the increased rate of undecomposed organic substance, being unfavorable in either case.

Then, the mixture is allowed to stand in an atmosphere maintainable at the system tempereture over 15° C. to keep the uniformity of fermentation by keeping the constant temperature with shutting off the system temperature from the outside temperature.

In case the temperature is below 15° C., the fermentation temperature is not sufficiently rise unfavorably.

After the system was kept at a constant temperature and shut off from the outside temperature, the fermentation temperature is maintained at 55°-80° C., preferably 60°-70° C. When the fermentation temperature is below 55° C., the temperature is maintained at 55°-60° C. by feeding air maintained over 15° C. into the system for a specified time to promote fermentation. However, since the cellulose content is restricted from the use of organic substance of carbon rate below 15% and the water content is restricted in mixing a large amount of porous carrier, the rise in fermentation temperature over 80° C. does not occur practically. By fermentation for at least 5days under the above state, the mycelium comprising thermoactinomyces is generated, and by carrying the mycelium on the porous carrier of pH 7.5-9.5 the mycelium fertilizer is produced.

In the invention, the fermentation period is preferably at least 5 days, more preferably 2-3 weeks.

The fermentation temperature is maintained at 55°-80° C., because, below 55° C., the thermoactinomyces can't be obtained at the expected rate of thermoactinomyces in the mycelium colony, and over 80° C., anaerobic germs grow, being unfavorable in either case.

In the invention, as mentioned above, the organic substance of 15% in the carbon rate is used, the water content of the organic substance is limited to 25-60%, 70-80 parts by weight of a porous carrier are used, and the particle size of the carrier is limited to 6-30 mesh, thereby the fermentation temperature don't rise over 80° C.

Accordingly, even if a process wherein the fermentation temperature is lowered by pouring water on the ferment, that is a so-called switch back process performed in an usual fermentation process, is not performed, the fermentation temperature don't rise over 80° C.

EFFECT OF THE INVENTION

As described above in detail, by the mycelial fertilizer and the producing method thereof according to the invention, thermoactinomyces including many useful germs can be selectively utilized as fertilizer, and the metabolities of thermoactinomyces, those are plants growth hormones or vitamins, display the effect in soil as effective fertilizers. In addition, since the carrier of the mycelium is a porous carrier of pH 7.5-9.5, the circumstances appropriate for the growth of thermoactinomyces are constantly maintained, the growth of filamentous fungi and bacteria is prevented, and air and water necessary for the circumstances for the growth of thermoactinomyces are retained by the porous carrier to supply them to thermoactinomyces.

The examples of the invention are described in the following to elucidate the effect of the invention.

EXAMPLE 1

As the porous carrier, 70 parts by weight of coconut-husk charcoal of pH 8.2, 25 mesh pass in particle size and 200 m$^2$/g of the internal surface area was used.

The porous carrier was kneaded with 25 parts by weight of fowl droppings of pH 8.8, 32.9% in water content and 9.6% in carbon rate.

The kneaded mixture was allowed to stand in a fermenter and the inside temperature of the fermenter was maintained at 25° C.

The temperature of the kneaded mixture was measured during fermentation, and at the time when the rise of the temperature started and the time when the temperature of the kneaded mixture was lowered below 55° C., during fermentation, air in the sysytem was directly fed into the ferment by pump to raise the temperature at a stroke in starting the rise of the temperature and to control the temperature constantly in the other time.

Through the fermentation process, the temperature in the ferment system didn't rise over 80° C.

COMPOSITION ANALYSIS

After stopping the fermentation, the mycelial fertilizer was analyzed; pH 8.9, good nitrogen 1.65%, pure protein 5.8%, vitamin $B_1$ 0.01 mg %, vitamin $B_2$ 0.06 mg %, pantothenic acid 0.17 mg % and nicotinic acid amide 0.30 mg %.

IDENTIFICATION OF THE GERM IN THE MYCELIUM

To identify the germ in the mycelium, 4 Petri dishes of 9 cm in diameter and 1.5 cm in depth were filled with culture media composed of agar and distilled water, and 20 particles of the above-mentioned mycelium were inoculated at equal spaces onto each of the Petri dishes(1-3).

As an example for comparison, a Petri dish (4) was treated equally as other Petri dishes except the use of untreated coconut-husk charcoal particles of 25 mesh pass.

After the Petri dishes(1-4) were cultured at 25° C., for 4 days, actinomyces and filamentous fungi were classified and analyzed by the number of colonies generated.

In the culture, the medium was sterilized in autoclave at 120° C. under 1 atmosphere pressure for 20 minutes in advance. As a result, in the Petri dish(1), 7.4 colonies of thermoactinomyces existed per particle of the sample on the average, while 5.0 colonies of filamentous fungi existed. In the Petri dish(2), 4.2 colonies of thermoactinomyces existed per particle of the sample on the average, while 1.8 colonies of filamentous fungi existed, and in the Petri dish(3), 2.0 colonies of thermoactinomyces existed per particle of the sample of the average, while 0.04 colony of filamentous fungi existed.

Among them, in thermoactinomyces, helical germs were dominant and, in filamentous fungi, Cladosporium, Penicillium and Nigrospora were found.

Since Cladosporium and Penicillium in these filamentous fungi were found also from the Petri dish of only coconut-husk active carbon particles used for an example for comparison, these were considered to be germs mixed from air. Accordingly, thermoactinomyces were practically dominant in the microorganism colonies of mycelial fertilizer.

The examples used such thermoactinomyces are described in the follwing.

In these tests, besides Example 1, as shown in Table 1, examples and those for comparison wherein various types of carriers were adopted and various organic substances were varied were tested, and these were treated under the same fermentation conditions as Example 1.

USE EXAMPLE

| Method | 1) Scale of test | Pot test (1/5000 a pot) |
|---|---|---|
|  | 2) Test item | Korean lawn grass |
|  | 3) Test soil | Sandy soil |
|  | 4) Test period | Apr.~Oct. |
|  | 5) Test section |  |
| Control section 3 pots |  |  |
| Each example section |  | using 10% in soil, each 3 pots |
|  |  | using 20% in soil, each 3 pots |
| Each example for |  | using 10% in soil, each 3 pots |
| comparison |  | using 20% in soil, each 3 pots |

In addition, 3 g of usual compound fertilizer was used for each pot.

The test soil was coarse sand 90.1%, fine sand 9.0%, silt 0.0%, clay 0.9%, base substitution capacity 0.44 me/100 g and pH 6.8. The weight of stem was measured after 6 months. The each average value is shown together in Table 2.

TABLE 1

|  | ORGANICS | | | | CARRIER | | | |
|---|---|---|---|---|---|---|---|---|
|  | *A | *B | *C | *D | *E | *F | *G | *H |
| Example 2 | 10 | 40 | *1 | 30 | 30 | *3 | 8.3 | 70 |
| Example 3 | 12 | 40 | *1 | 25 | 10 | *3 | 8.3 | 75 |
| Example 4 | 15 | 40 | *1 | 20 | 20 | *3 | 8.3 | 80 |
| Example 5 | 15 | 40 | *1 | 23 | 6 | *3 | 8.3 | 77 |
| Comparison 1 | 20 | 40 | *1 | 40 | 3 | *3 | 8.3 | 60 |
| Comparison 2 | 10 | 65 | *1 | 50 | 30 | *3 | 8.3 | 50 |
| Example 6 | 12 | 25 | *2 | 20 | 6 | *4 | 8.5 | 80 |
| Example 7 | 15 | 30 | *2 | 25 | 10 | *4 | 9.0 | 75 |
| Example 8 | 15 | 30 | *2 | 30 | 30 | *4 | 8.4 | 70 |
| Comparison 3 | 20 | 20 | *2 | 35 | 3 | *4 | 7.0 | 65 |
| Comparison 4 | 25 | 10 | *2 | 15 | 40 | *4 | 7.5 | 85 |

*A Rate of Carbon.
*B Moisture Content.
*C Species
*D Content Rate.
*E Mesh.
*F Species
*G PH.
*D Content Rate
*1 means fowl droppings.
*2 means the mixture of fowl droppings, cow dung, dry glasses and so on.
*3 means chacoals.
*4 means parmuculite.

TABLE 2

|  | Weight of Caulis | |
|---|---|---|
|  | 10% parts | 20% parts |
| Example 1 | 26.8 | 38.0 |
| Example 2 | 24.2 | 37.4 |
| Example 3 | 23.1 | 37.9 |
| Example 4 | 25.2 | 36.5 |
| Example 5 | 26.5 | 38.2 |
| Example 6 | 25.8 | 38.4 |
| Example 7 | 22.5 | 37.5 |
| Example 8 | 24.8 | 36.2 |
| Comparison 1 | 15.1 | 20.1 |
| Comparison 2 | 18.5 | 25.0 |
| Comparison 3 | 7.0 | 13.0 |
| Comparison 4 | 5.5 | 11.0 |
| blanks | 12.3 |  |

I claim:
1. A process for preparing a carrier-supported mycelial fertilizer consisting of cultivating a thermoactinomyces fungus at a temperature of about 55°-80° C. and at a pH of about 7.9-9.5 on a mixture containing 70-80 parts by weight of at least one porous carrier selected from the group consisting of charcoal, active carbon, coal, coke and active coke, with 30-20 parts by weight of an organic substance having a water content of about 25-60% by weight and less than about 15% by weight carbon and capable of being fermented by said fungus.
2. A process according to claim 1, wherein the porous carrier has a particle size of about 6-30 mesh.
3. The carrier-supported mycelial fertilizer prepared by the process of claim 1.
4. The carrier-supported mycelial fertilizer prepared by the process of claim 2.

* * * * *